United States Patent [19]
Milne et al.

[11] Patent Number: 5,943,484
[45] Date of Patent: Aug. 24, 1999

[54] ADVANCED MATERIAL REQUIREMENTS PLANNING IN MICROELECTRONICS MANUFACTURING

[75] Inventors: Robert J. Milne, Jericho; Robert A. Orzell, Essex Junction, both of Vt.; Chih-Kuan Yen, Ann Arbor, Mich.

[73] Assignee: International Business Machines Corporation, Armonk, N.Y.

[21] Appl. No.: 08/938,130

[22] Filed: Sep. 26, 1997

[51] Int. Cl.[6] ............................. G06F 19/00; G06G 7/122; G06G 7/50

[52] U.S. Cl. ..................... 395/500; 364/468.01; 345/467; 395/701

[58] Field of Search ............................... 395/500; 705/28; 364/705, 468.13, 468.14

[56] References Cited

U.S. PATENT DOCUMENTS 4,887,218  12/1989  Natarajan .
5,369,570  11/1994  Parad ........................................... 705/8
5,479,343  12/1995  Matoba et al. .
5,548,518   8/1996  Dietrich et al. .

OTHER PUBLICATIONS

Leachman, R., "Modeling Techniques for Automated Production Planning in the Semiconductor Industry," *Optimization in the Industry*, John Wiley & Sons (1993).

Kistner, K., et al., "Applications of Operations Research in Hierarchial Production Planning," *Modern Production Concepts*, Springer–Verlag (1990).

*Primary Examiner*—Kevin J. Teska
*Assistant Examiner*—Hugh Jones
*Attorney, Agent, or Firm*—Whitham, Curtis & Whitham; Richard M. Kotulak

[57] ABSTRACT

A computer implemented decision support tool serves as an Advanced Material Requirements Planning (AMRP) solver to generate a match between existing assets and demands across multiple manufacturing facilities within the boundaries established by the manufacturing specifications and process flows and business policies to determine what (and when) is needed to start internally or purchase externally to meet all customer demands of current interest. The matching must take into account manufacturing or production specifications and business guidelines. To accomplish the task of deciding what to do when to meet customer demand, the AMRP solver explodes demands into a build plan for purchased and manufacturing orders for end items as well as components and raw materials necessary to produce those end items. The AMRP solver combines traditional MRP decision technology with linear programming (LP) decision technology to provide both speed and intelligence in the matching process.

7 Claims, 12 Drawing Sheets

ADVANCED MATERIAL REQUIREMENTS PLANNING IN MICROELECTRONICS MANUFACTURING

CROSS-REFERENCE TO RELATED APPLICATIONS

This application incorporates by reference the subject matter of U.S. patent application Ser. No. 08/926,131 filed Sep. 9, 1997, by G. Dangat, A. Gokhale, S. Li, R. Milne, R. Orzell, R. Reid, X. Tang, and C. Yen, for "Best Can Do Matching of Assets with Demand in Microelectronics Manufacturing" (IBM Docket BU9-96-194).

BACKGROUND OF THE INVENTION

1. Field of the Invention

The present invention generally relates to computer implemented planning resources and decision support tools and, more particularly, to a tool in which core production planning information is provided to a solver which generates a plan of what (and when) is needed to start internally or purchase externally to meet all customer demands of current interest. The invention generates an intelligent MRP match between existing assets and demands across multiple manufacturing facilities within the boundaries established by the manufacturing specifications and process flows and business policies.

2. Background Description

Within the complexity of semiconductor manufacturing, four related decision areas or tiers can be distinguished based on the time scale of the planning horizon and the apparent width of the opportunity window. To facilitate an understanding of the four decision tiers in semiconductor manufacturing, we will reference the following oven example. FIG. 1 is a diagram associated with this example.

Within a zone of control 10, there is a coater machine 12, a work-in-progress (WIP) queue 14, and an oven set 16. Wafers move around the zone of control in groups of twenty-five called a lot. All wafers in the lot are the same type. Each lot must pass through the oven operation ten times. Each oven set is composed of four ovens or tubes 161, 162, 163, and 164 and one robot 166 to load and unload the oven. It takes about ten minutes to load or unload an oven. The process time in the oven depends on the iteration. We will assume one lot to an oven at a time. Before a wafer enters into the oven it must be coated by the coater machine 12. The coating process takes twenty minutes. The coating expires in four hours. If the coating expires the wafer must be stripped, cleaned, recoated. This process takes four hours and often generates yield losses.

The first decision tier, strategic scheduling, is driven by the time frame or lead time required for business plan, resource acquisition, and new product introduction. This tier can often be viewed in two parts; very long-term and long-term. Here, decision makers are concerned with a set of problems that are three months to seven years into the future. Issues considered include, but are not limited to, what markets the firm will be in, general availability of tooling and workers, major changes in processes, changes in or risk assessment of demand for existing product, required or expected incremental improvements in the production process, lead times for additional tooling, manpower and planning. In the oven example of FIG. 1, very long-term decisions are made on whether the ovens are necessary to the production process and, if so, the characteristics needed in the oven. Long-term decisions are made about how many ovens to buy. Tools typically used in planning of this scope are models for capacity planning, cost/pricing, investment optimization, and simulations of key business measures.

The second tier, tactical scheduling, deals with problems the company faces in the next week to six months. Estimates are made of yields, cycle times, and binning percentages. Permissible substitutions are identified. Decisions are made about scheduling starts or releases into the manufacturing line (committing available capacity to new starts). Delivery dates are estimated for firm orders, available "outs" by time buckets are estimated for bulk products, and daily going rates for schedule driven product are set. The order/release plan is generated/regenerated. Reschedules are negotiated with or requested by the ultimate customer. In the oven example of FIG. 1, decisions would be made on the daily going rate for different products, allocation of resources between operations, the number of operators to assign, and machine dedication. Tools typically used in the planning and scheduling of this phase are forward schedulers, fast capacity checkers, and optimization of capacity, commits and cost.

The third tier, operational scheduling, deals with the execution and achievement of a weekly plan. Shipments are made. Serviceability levels are measured. Recovery actions are taken. Optimized consumption of capacity and output of product computed. Tools typically use in support of daily activities are decision support, recovery models, prioritization techniques and deterministic forward schedulers. Manufacturing Execution Systems (MES) are used for floor communications and control. In the oven example of FIG. 1, priorities would be placed on each lot arriving at the ovens based on their relevance to current plan or record. If the ovens "go down" their priority in the repair cue would be set by decisions made in this tier.

The fourth tier, dispatch scheduling or response system, addresses the problems of the next hour to a few weeks by responding to conditions as they emerge in real time and accommodate variances from availability assumed by systems in the plan creation and commitment phases. Essentially, they instruct the operator what to do next to achieve the current goals of manufacturing. Dispatch scheduling decisions concern monitoring and controlling of the actual manufacturing flow or logistics. Here, decisions are made concerning trade-offs between running test lots for a change in an existing product or a new product and running regular manufacturing lots, lot expiration, prioritizing late lots, positioning preventive maintenance downtime, production of similar product to reduce setup time, down stream needs, simultaneous requests on the same piece of equipment, preferred machines for yield considerations, assigning personnel to machines, covering for absences, and reestablishing steady production flow after a machine has been down. In the oven example of FIG. 1, the question is which lot (if any) is run next when an oven is free. Tools used are rule based dispatchers, short interval schedulers and mechanical Work-In-Progress (WIP) limiting constructions.

Of course, there is overlap and interaction between the four decision tiers, but typically different groups are responsible for different scheduling decisions. For example, maintenance may decide on training for their personnel, on work schedules for their people, preventive maintenance, and what machine to repair next. Finance and each building superintendent may make decisions on capital equipment purchases. Industrial Engineering may have the final say on total manpower, but a building superintendent may do the day-to-day scheduling. Marketing may decide when orders for products can be filled and what schedule commitments to make. For strategic and operational decisions, these groups and their associated decision support tools are loosely coordinated or coupled. Finance only requires an estimate of required new tools from each building to estimate capital purchase. Each building requires an estimate on new tool requirements from the product development people. For dispatch decisions, they must be tightly coupled. Lots only get processed when the appropriate tool, operator, and raw material are available. At dispatch rough estimates are no longer sufficient. If a machine is down maintenance must have the appropriately trained individual available to repair the machine. Manufacturing must have the appropriate mix of tools and workers to produce finished goods on a timely basis. At dispatch the decisions made by various groups must be in synchronization or nothing is produced. A manufacturing facility accommodates this tight coupling in only one of two ways: slack (extra tooling and manpower, long lead times, limited product variation, excess inventory and people, differential quality, brand loyalty, and so forth) or strong information systems to make effective decisions.

Within the first, second and third decision tiers, a major planning activity undertaken by microelectronic firms is matching assets with demands. This activity can be broken into three major types of matching that are used throughout the microelectronics industry to support decision making:

(a) Material Requirements Planning (MRP) type of matching—"Opportunity Identification" or "Wish List". For a given set of demand and a given asset profile what work needs to be accomplished to meet demand.

(b) Projected Supply Planning (PSP). Given a set of assets, manufacturing specifications, and business guidelines this application creates an expected or projected supply picture over the next "t" time units. The user supplied guidelines direct how to flow or flush assets "forward" to some inventory or holding point.

(c) Best Can Do (BCD). Given the current manufacturing condition and a prioritized set of demands which demands can be met in what time frame. BCD generally refers to a large set of demands. A preferred BCD is described in application Ser. No. 08/926,131 (IBM Docket BU9-96-194).

Arguably, the oldest type of matching is Material Requirements Planning (MRP). MRP is a system for translating demand for final products into specific raw material and manufacturing activity requirements by exploding demand backwards through the bill of material (BOM) and assets. Many authors have published papers and books on MRP. For example, Joseph Orlickly wrote *Material Requirements Planning,* published by McGraw-Hill, which has become a standard reference. As practiced in the microelectronics industry, MRP systems operate at a specific part number and inventory holding point level of detail.

A difficulty with traditional MRP logic is that it does not adequately handle binned parts. Multiple integrated circuit chips, such as microprocessors, are manufactured on a single semiconductor wafer and separated into individual chips by dicing the wafer. Although all chips are manufactured on a single wafer, testing each chip will reveal that there are variances in the performances of the chips. Assume that the microprocessors are designed for a particular clock speed, say 200 MHz. However, testing the chips shows that there is only a 50% yield of chips meeting this criteria. Of the remaining 50% of the chips, some may perform at a slower but still fast clock speed, say 175 MHz, and others at a still slower clock speed, say 150 MHz. Traditional MRP vastly overstates the required wafer starts needed to meet demand in binning situations. However, for some time an optimization model has been known which minimizes wafer starts in binning situations. Traditionally, this optimization was used in a stand alone form or within another optimization routine.

The "Matching Assets With Demands" problems in semiconductor manufacturing are further complicated by the presence of alternate processes each with its own characteristics (date effective bill of material, yields., cycle times, binning percentages), permissible part number substitutions, and lot-sizing considerations, among others. The proper decisions on which processes to use and which substitutions to make depend upon the state of Work-In-Process (WIP) and on-hand inventory throughout the bills of material supply chains as well as the date-effective cycle times, yields, and binning percentages. Existing heuristic decision technologies make decisions one bills of material level (or at most two levels) at a time thereby ignoring the impact of inventories, cycle times, yields, and binning percentages further down the supply chain. Consequently, the decisions resulting from heuristic technology applied to this environment tend to be poor. One skilled in the art might think of Linear Programming (LP) technology as a means of making optimal decisions considering the global picture. Such technology is effective in terms of considering the full supply chain inventories, cycle times, yields, and binning percentages. However, Linear Programs tend to be slow. Furthermore, lot-sizing poses a challenge for optimization technology such as Linear Programming. Lot-sizing typically requires each production start to have a release quantity of no less than a specified minimum quantity, no more than a specified maximum quantity, and also a multiple of a third specified quantity. Such considerations are non-linear and thus are only modeled in current optimization technology by introducing integer variables. The result would be an Integer Program which would take much longer to execute than the (hardly fast) Linear Program. In practice, this makes Integer Programs unacceptably slow when tackling the scale of most matching problems found in microelectronics.

The solution we propose utilizes the best elements of the Linear Programming (LP) and heuristic technologies and integrates those elements synergistically in a cohesive fashion. This solution utilizes LP technology only where it is needed (to make process and substitution decisions) and utilizes the (faster) heuristic technology to address lot-sizing and other non-linear factors. The resulting matching decisions are more intelligent than those found under other matching methods and can be obtained in a reasonable period of time.

SUMMARY OF THE INVENTION

It is therefore an object of the present invention to provide a computer implemented decision support tool serving as a solver to generate an advanced material requirements planning (AMRP) match between existing assets and demands across multiple manufacturing facilities within the boundaries established by the manufacturing specifications and process flows and business policies to determine what (and when) is needed to start internally or purchase externally to meet all customer demands of current interest.

It is another object of the invention to provide an accurate material requirements plan by using LP decision technology which reduces the overstated required starts and purchases that often arise when traditional Material Requirements Planning (MRP) explode algorithms are used to handle the complex production specification structures that arise in semiconductor and microelectronics manufacturing.

It is another object of the invention to provide a fast AMRP by deploying traditional MRP explode algorithms where appropriate.

It is another object of the invention to create a seamless synergy between two distinct decision technologies (LP and Heuristic) to create a superior solution to the AMRP matching requirement.

According to the invention, there is provided a computer implemented decision support tool (AMRP) which serves as a solver to generate a match between existing assets and demands across multiple manufacturing facilities within the boundaries established by the manufacturing specifications, process flows, and business policies to determine what needs to be started internally or purchased externally (and when) to meet all customer demands of current interest.

Assets include, but are not limited to, starts, Work In Process (WIP), inventory, and purchases. Demands include, but are not limited to, firm orders, forecasted orders, and inventory buffer. The matching must take into account manufacturing or production specifications and business guidelines. Manufacturing specifications and process flows include, but are not limited to, build options, bills of material, yields, cycle times, receipt dates, allowable substitutions, binning or sorting, and shipping times. Business guidelines include, but are not limited to, frozen zones, lot-sizing, demand priorities, priority tradeoffs, preferred suppliers, and inventory policy.

To accomplish the task of deciding what to do to meet customer demand, the AMRP according to the invention explodes demands into a build plan for purchased and manufacturing orders for end items as well as components and raw materials necessary to produce those end items. Among the information calculated are (a) recommended future manufacturing starts (planned manufacturing orders), (b) recommended new purchase orders, (c) calculation of "need date" for each WIP lot in the manufacturing line based on when the lot is required to meet customer demand, (d) new purchase orders and recommended alterations is to existing purchase orders guided by user set rules, (e) recommended interplant shipments in a multi-site environment, and (f) recommended substitutions.

Within microelectronics and semiconductor manufacturing, the task of exploding demand and netting against existing assets (WIP and inventory) is especially difficult due to the complexity of the manufacturing options and processes (production specification structures). Examples of these complexities include, but are not limited to, binning and downgrade substitutions, complex substitutions between part numbers, multiple processes within the same manufacturing facility to make the same part, ability of different plants to make the same part, and restrictions on shipments between manufacturing plants.

Traditional MRP algorithms do not adequately handle these complexities and as a result significantly overstate the required starts and purchases to meet the customer demands of current interest. To overcome this limitation, the AMRP solver combines traditional MRP decision technology with linear programming decision technology to provide both speed and intelligence in the matching process. The additional intelligence significantly reduces the requested starts and purchases by appropriately handling the complexities that arise as part of the normal manufacturing processes in semiconductor and microelectronics manufacturing. Also, the AMRP solver has a run-time that is far superior to that of a stand-alone LP tool while also accommodating lot-sizing constraints and the daily granularity requirements.

The AMRP solver has the following four major components: (a) a method which classifies each part number (based on its characteristics and those of parts connected to it in the bills of material supply chains) as an MRP part, an LPMRP part, or a non-critical component; (b) an MRP run for parts with only simple substitutions around binning processes; (c) an LPMRP run for the (complex) LPMRP parts; and (d) an MRP run for the non-critical parts. The LPMRP method includes a series of integrated LP and MRP runs at each level of the bills of material.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
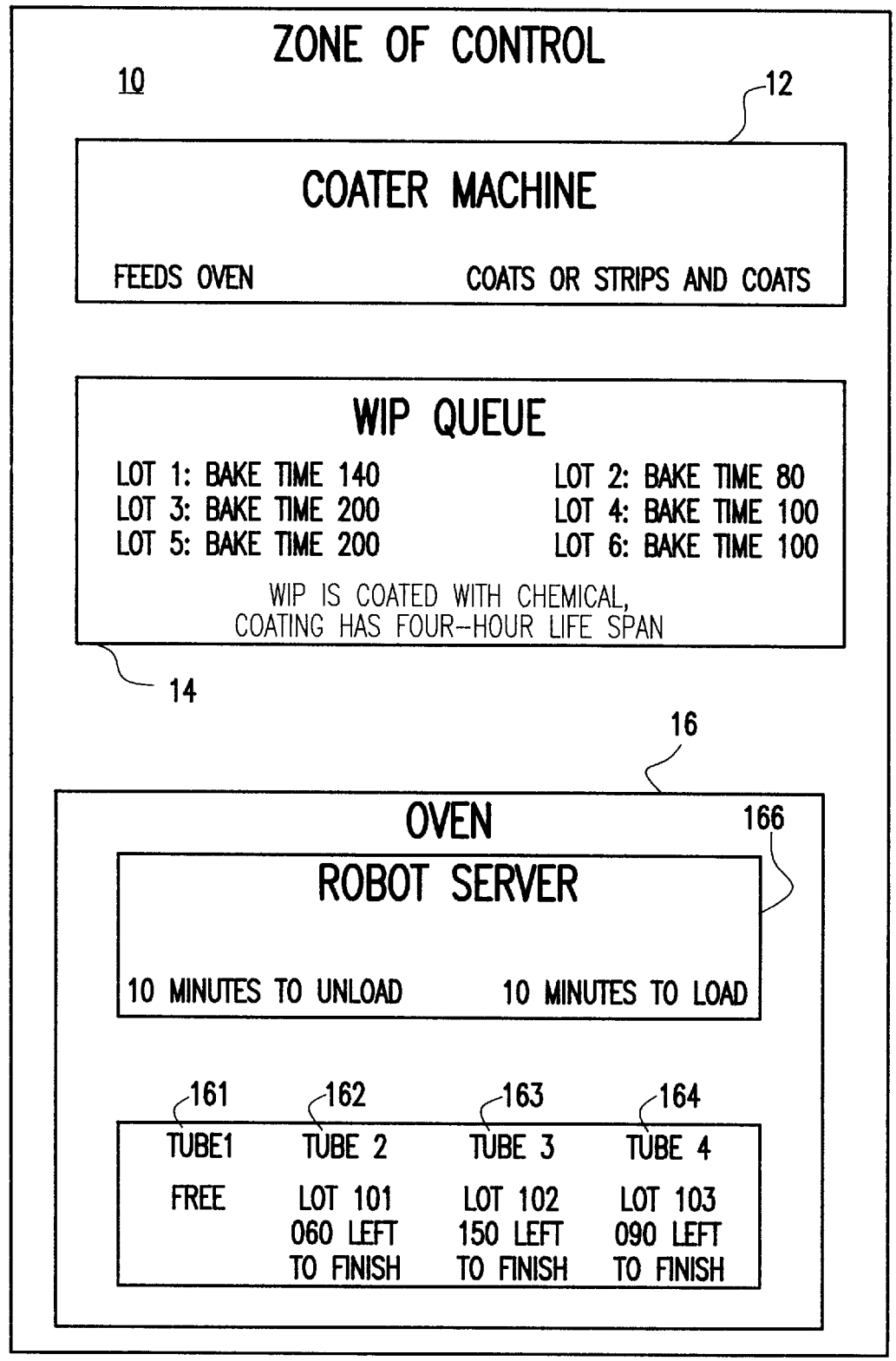
FIG. 1 is a block diagram of an oven dispatch example used to illustrate decision areas or tiers based on a planning horizon.
Figure 2:
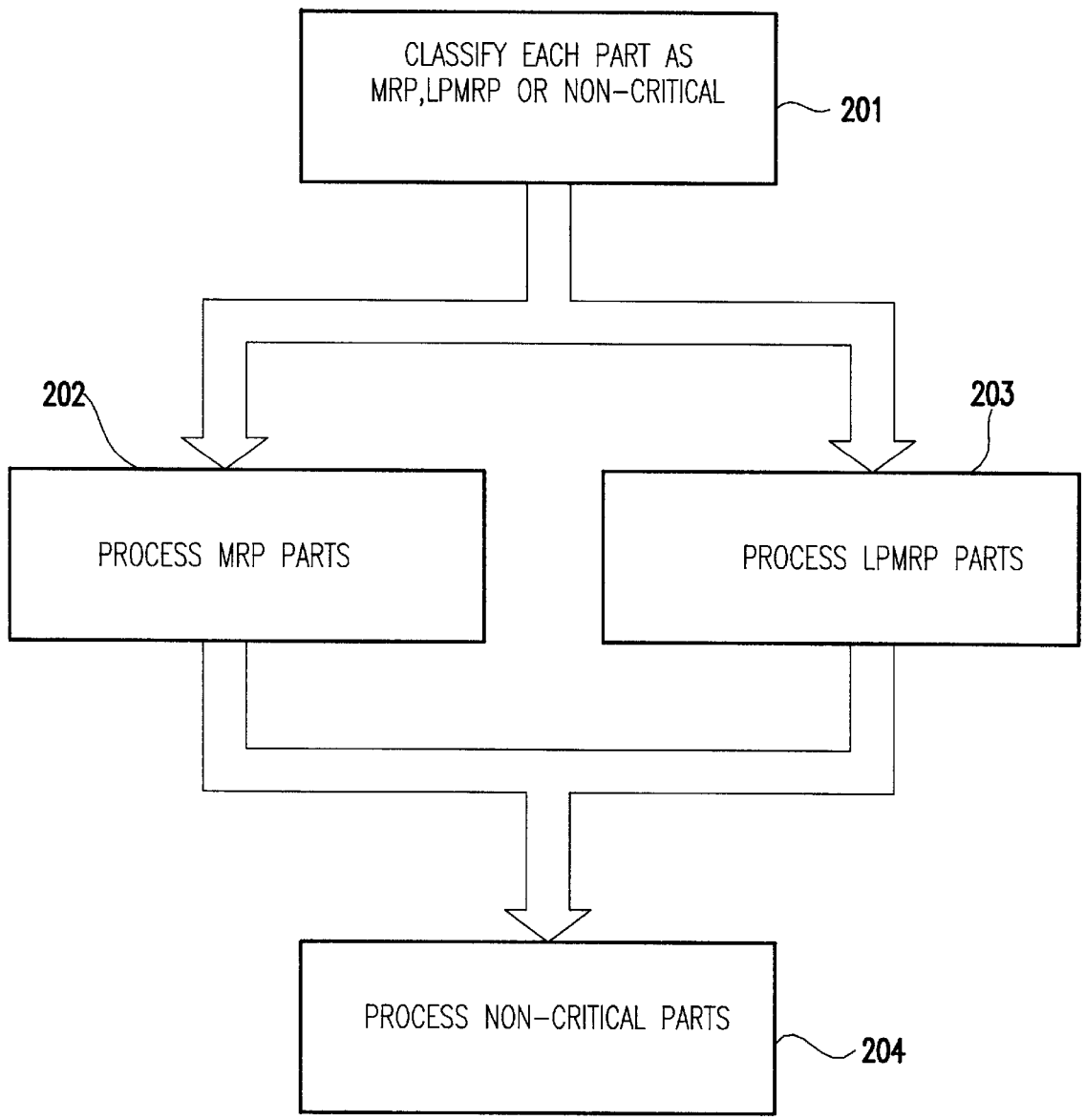
FIG. 2 is a flow diagram showing the steps and overall flow of the Advanced Material Requirements Planning (AMRP) method according to the preferred embodiment of the invention.

Referring again to the drawings, and more particularly to FIG. 2, there is shown a flow diagram of the overall organization of the advanced material requirements planning (AMRP) asset and demand matching decision support tool according to a preferred embodiment of the invention. This tool has been implemented to run on a 16-WAY IBM SP2 machine with AFS for storage. The SP2 is a collection IBM RS6000 engines running under a common umbrella and the AIX operating system (IBM's version of the UNIX operating system) and connected with a high speed switch. It could be implemented on other hardware platforms including, but not limited to, mini computers, stand alone UNIX or Windows NT workstations, or workstations in a network, or mainframes, including IBM AS400 and ES9000 computers.

Figure 3:
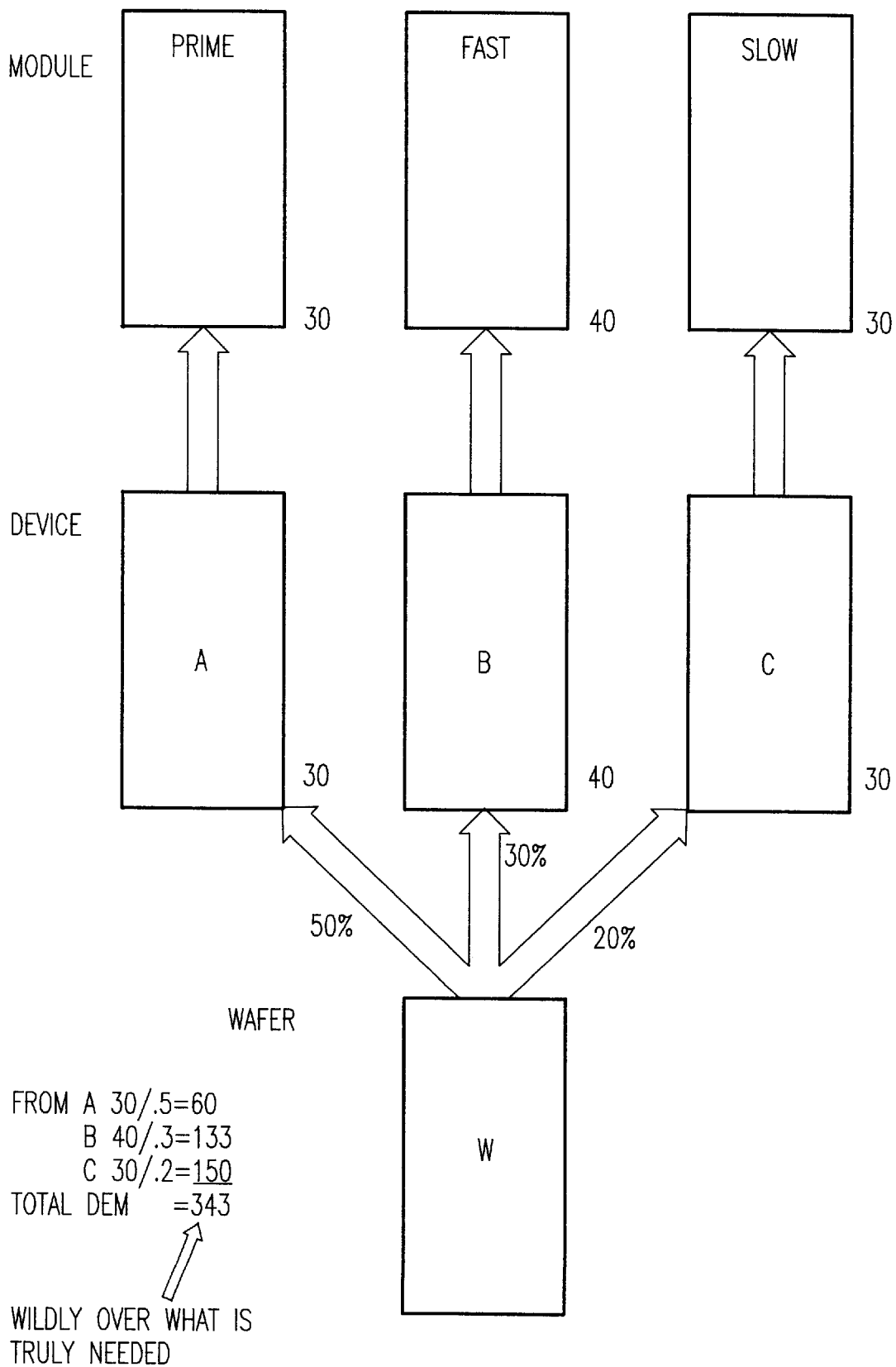
FIG. 3 is a block diagram showing the principles of traditional Material Requirements Planning (MRP) as applied to a binning example in semiconductor manufacturing.

To best illustrate the underlying binning process in semiconductor manufacturing and the need for special logic within a standard MRP reference is made first to FIG. 3 which illustrates what happens if standard MRP logic is applied to binning, downgrading or sorting. Multiple integrated circuit (IC) chips, such as microprocessors, are manufactured on a single semiconductor wafer and separated into individual chips by dicing the wafer. Although all the chips are manufactured on a single wafer, testing each chip will reveal that there are variances in the performances of the chips. Assume that the microprocessors are designed for a particular clock speed, say 200 MHz. However, testing the chips shows that there is only a 50% yield of chips meeting this criteria. Of the remaining 50% of the chips, some may perform at a slower but still fast clock speed, say 175 MHz, and others at a still slower clock speed, say 150 MHz. In the example illustrated, there is a 30% yield of chips which will operate at the fast clock speed but not the fastest or "prime" clock speed, and there is a 20% yield of chips which will operate at the slow clock speed. Therefore, if thirty "prime" clock speed microprocessors are needed for product output, then at least sixty microprocessors will need to be manufactured to meet this demand for a 50% yield. If forty of the fast microprocessors are needed, then one hundred thirty-three will have to be manufactured for a 30% yield, and if thirty of the slow microprocessors are needed, then one hundred fifty will have to be manufactured for a 20% yield. Thus, under the standard MRP model a total of three hundred forty-three chips would have to be made to meet this hypothetical demand.

Clearly, economies can be realized taking into account that if the maximum number of chips required for product with the highest demand are manufactured, there will be sufficient numbers of co-product chips to meet the demands for those requirements as well. In the example illustrated in FIG. 3, the maximum number for each of the product demands is one hundred fifty. Thus, instead of manufacturing three hundred forty-three chips, only one hundred fifty chips would be manufactured.

Further economies can be realized by recognizing some chips can be substituted for other chips to meet their demand. In our example, a prime chip can be used to meet the demand for either a fast or slow chip. A fast chip can be used to meet the demand for a slow chip.

Figure 4:
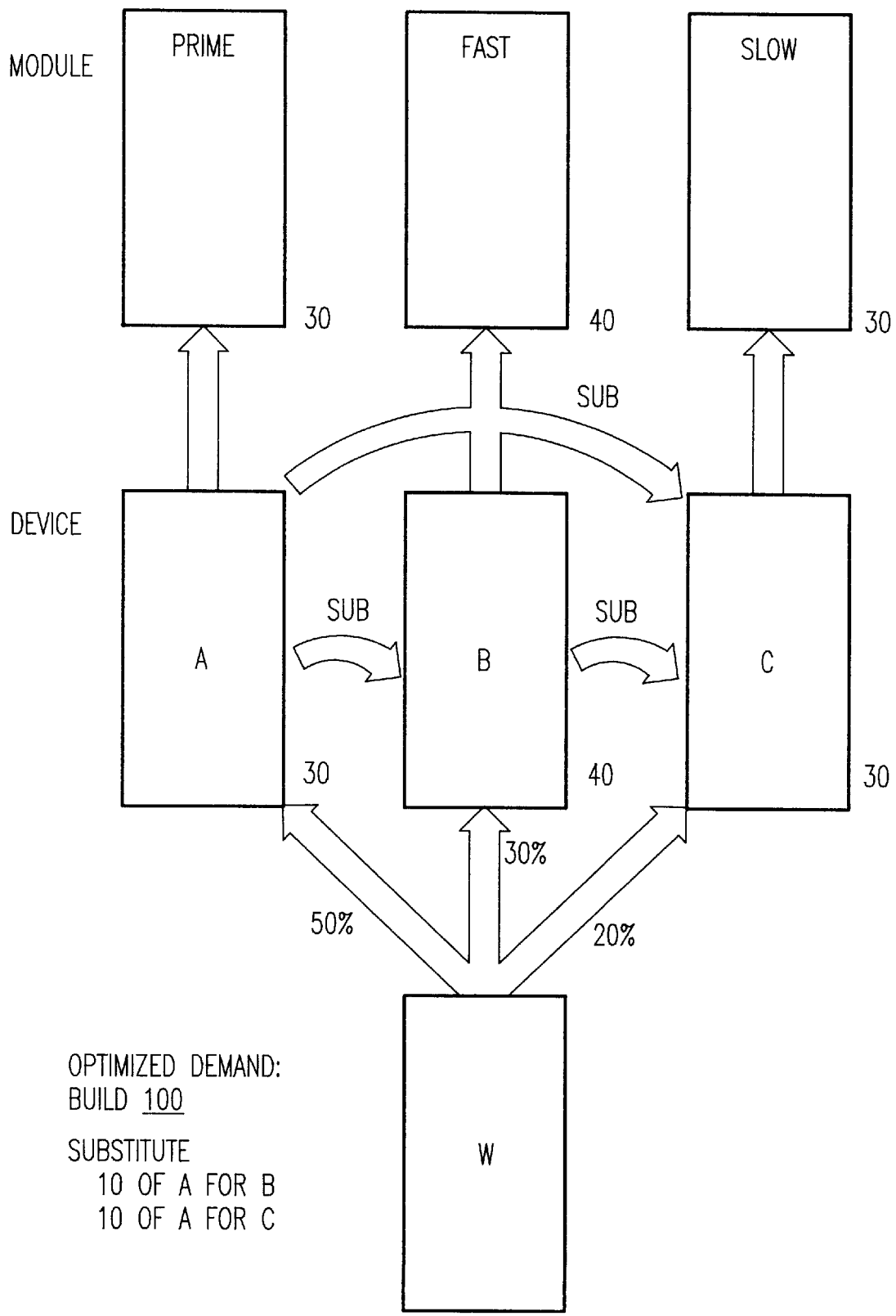
FIG. 4 is a block diagram showing the principles of the logic within an intelligent MRP tool to optimally handle the binning situation.

The present invention implements an advanced feature to identify both economies across time dynamically and therefore reduce the calculated starts. This particular feature is described in application Ser. No. 08/926,131 (IBM Docket BU9-96-194) and is illustrated in FIG. 4. Here, the same assumptions apply, but if only one hundred chips are built, rather than the three hundred forty-three in the traditional MRP and one hundred fifty required in the modified MRP. A 50% yield for the "prime" microprocessors will provide fifty microprocessors which will run at the highest clock speed. But only thirty are required in the demand example, so there are twenty extra microprocessors which meet or exceed the requirements for the fast and slow microprocessor demands. A 30% yield of the fast microprocessors produces only thirty microprocessors where forty are needed. Therefore, ten of the extra prime microprocessors are added to the thirty fast microprocessors to meet the demand. Similarly, a 20% yield of the slow microprocessors produces only twenty where thirty are needed. Again, ten of the extra prime microprocessors are added to the twenty slow microprocessors to meet that demand. We refer to an MRP which makes optimal decisions only regarding simple binning situations as described above as an "Intelligent MRP." The situations described in the subsequent two paragraphs cannot be handled adequately by an Intelligent MRP. Rather, the situations require the LPMRP method presented for the first time in the present invention.

Figure 5:
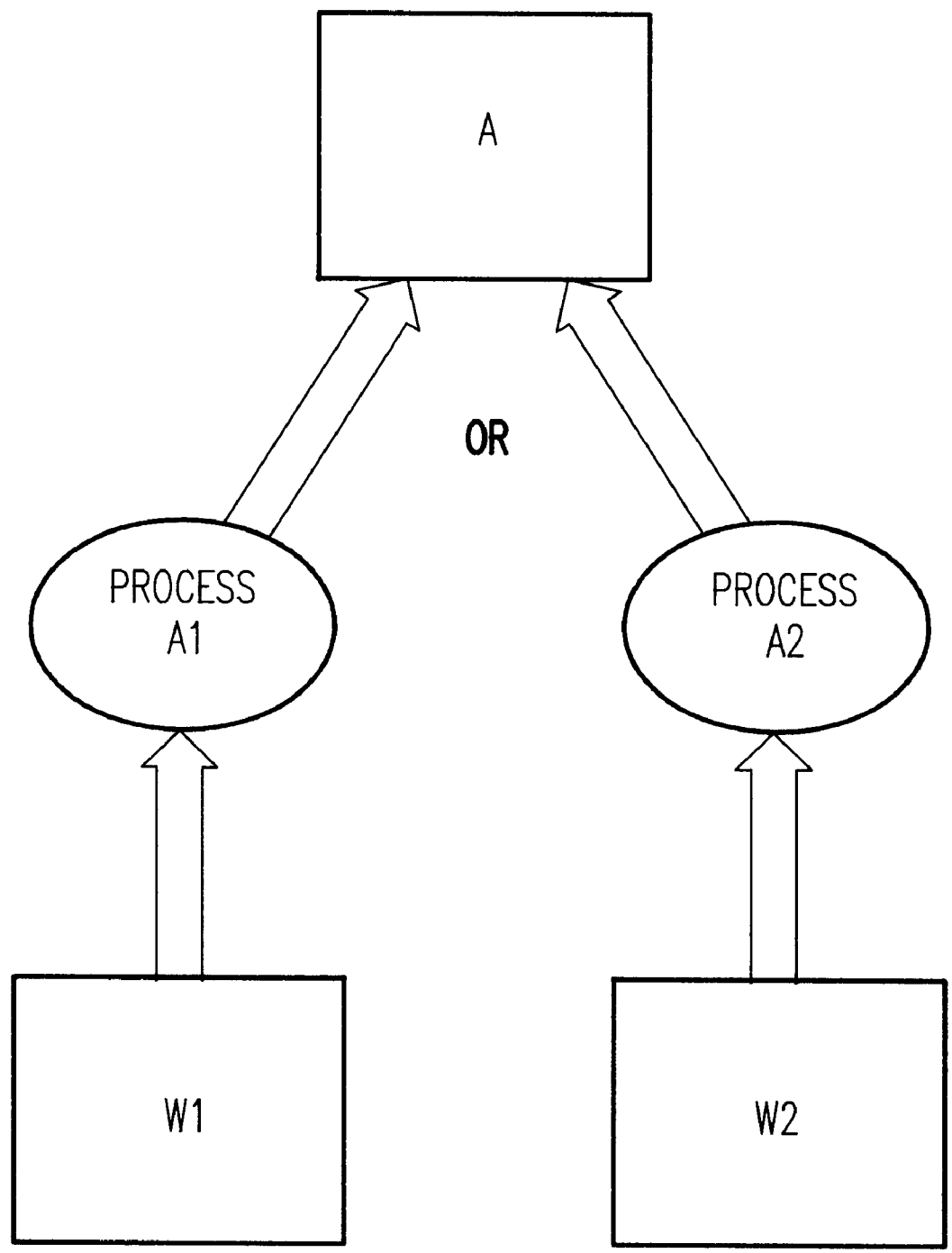
FIG. 5 is a block diagram showing the product specification structures where multiple process are able to make part A.

To further illustrate the complex product flows and the need for special logic within a standard MRP reference is made to FIG. 5 which shows an example product flow when there are two processes available to make part A. Part A can be made by either process A1 or A2. To create part A, process A1 consumes supply of component part W1, while manufacturing part A using process A2 consumes supply of component part W2. The material planning method must decide which process should be used when and in what amounts to minimize the manufacturing starts required. For example, if we need to produce one hundred units of part A as soon as possible and we have one hundred units of component part W1 in stock and zero units of component part W2 in stock then there are clear economies by selecting process A1 to produce part A as long as the cycle time of process A1 is reasonably close to the cycle time of process A2. For a modification of that example, assume the yield for process A1 is 50% and the yield for process A2 is 100%. If we need to produce one hundred units of part A as soon as possible and we have one hundred units of component part W1 in stock and one hundred units of component part W2 in stock then there are clear economies by selecting process A2 to produce part A since it will only require one hundred (100/1) starts as opposed to two hundred starts (100/0.5). If there were no on-hand or work-in-process (WIP) inventory for component parts W1 and W2, then the best decision depends on the available options for supplying W1 and W2 and the corresponding inventories, yields, cycle times, and binning percentages of the parts involved in the supply chains of those options. Since even an intelligent MRP cannot consider all (or even most) of the relevant factors, the situations described in this paragraph call for the invocation of linear programming technology which will be imbedded as a component of the LPMRP method described later below.

Figure 6:
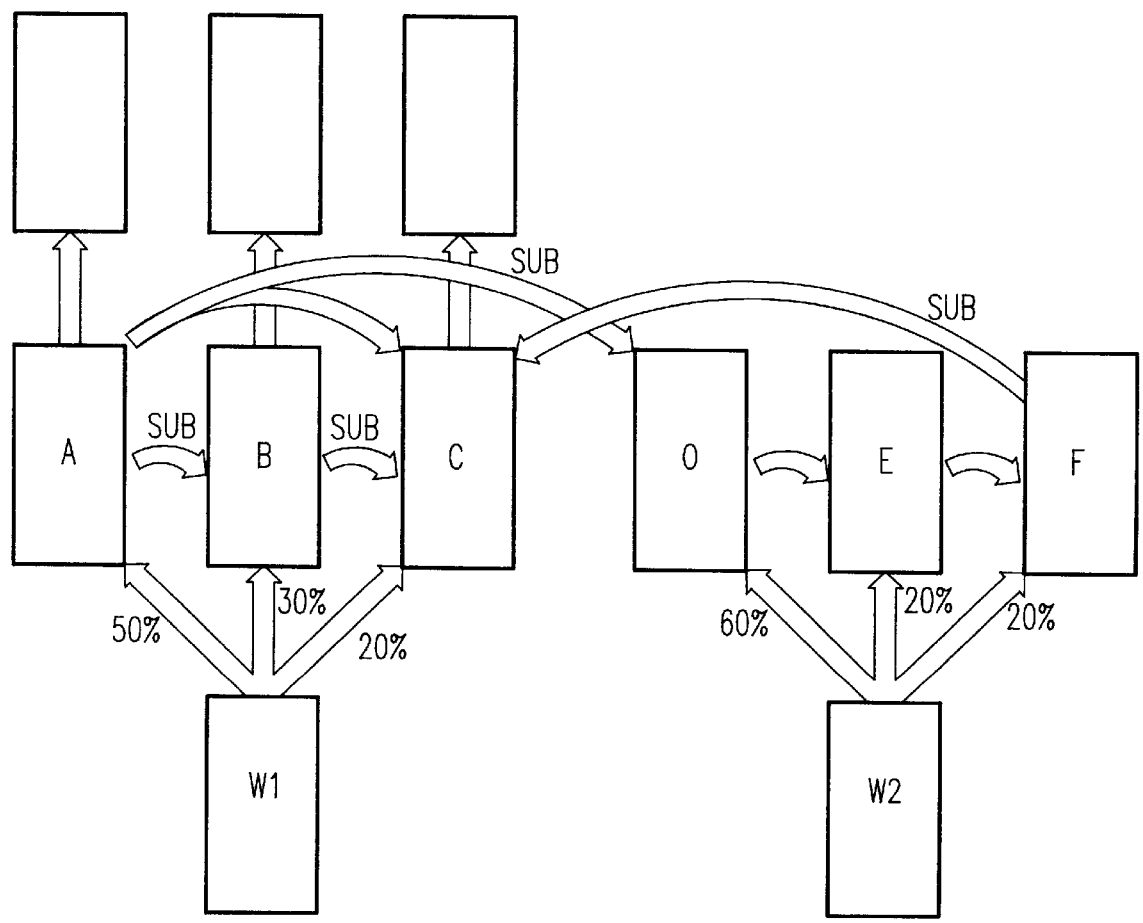
FIG. 6 is a block diagram showing a complex manufacturing process that requires the LPMRP method to intelligently work through two binning processes which produce parts where some substitutions are possible.

To further illustrate the complex product flows and the need for special logic within a standard MRP, reference is made to FIG. 6 which adds a second binning process to the flow diagrammed in FIGS. 3 and 4 which generates parts which can substitute for output from the original binning process. In FIG. 6, a second wafer (W2) is "binned" into three devices O, E, and F with the percentages 60, 20, and 20. Device A can be substituted for device O. Device F can be substituted for device C. The demand for prime, fast, and slow modules remains 30, 40, and 30, respectfully. However, now the planner has the option making starts for both W1 and W2 to meet this demand. This again requires the LPMRP method described later as even an intelligent MRP cannot consider all relevant factors.

The above discussion illustrates which situations may be adequately modeled using a simple or intelligent MRP and which situations require the use of the LPMRP method. We will now describe in greater detail the logic encompassed within Block 201 of FIG. 2 which involves the classification of parts as MRP, LPMRP, or Non-critical. Since the traditional and intelligent MRP processes may each be executed quickly, we do not make a distinction between parts requiring the intelligent MRP and those for which the traditional (simple) MRP logic is adequate; rather, in the preferred embodiment of this invention, all parts which are classified as MRP parts are processed through the intelligent MRP process, which we will refer to as simply, "MRP," for the remainder of this section. Both the parts classified as MRP and those classified as Non-critical will be run through the (fast) MRP logic. Only those parts classified as LPMRP will be processed using the LPMRP method. Since the LPMRP method is slower than the MRP method, the general idea is to classify as many parts as possible as either MRP or non-critical. Of course, some parts will be classified as requiring the LPMRP method to ensure that the resulting Advanced Material Requirements Plan (AMRP) is of excellent quality.

Figure 7:
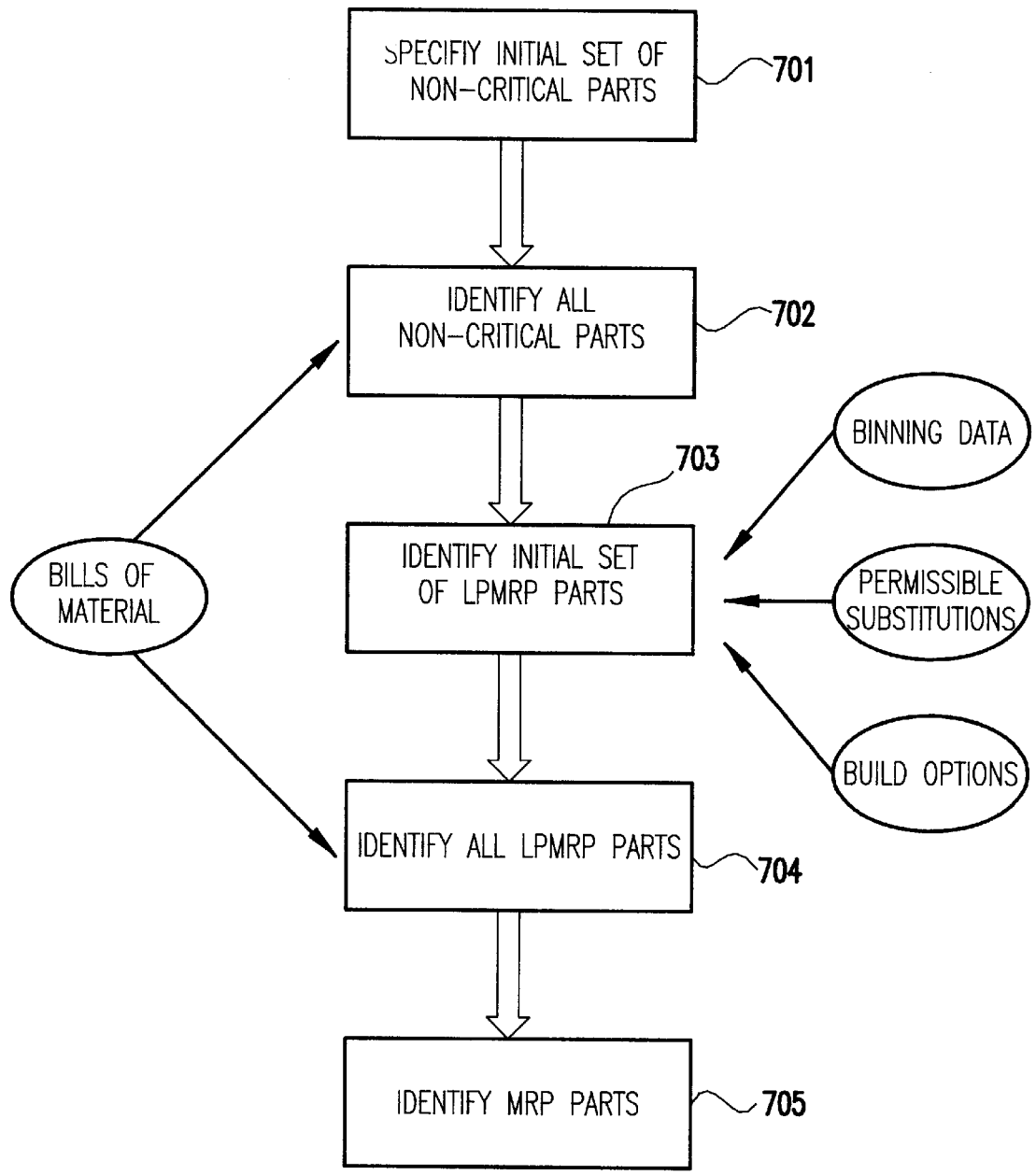
FIG. 7 is a flow diagram showing the steps of the method used to classify each part number as MRP, LPMRP, or Non-critical.

Block 201 of FIG. 2 is expanded upon in FIG. 7 which illustrates the method for classifying each part as one of MRP, LPMRP, and Non-critical. First, an initial set of non-critical part numbers is determined in Block 701 of FIG. 7. Typically, these parts are specified by the production planner responsible for the results of the AMRP method. We use the term, "non-critical," loosely to mean those parts which the planner knows can be run with MRP as can their components and sub-components. Often these are commodity or bulk parts such as raw wafers and generally lie towards the bottom of the bills of material supply chains. These parts are often components of the MRP and/or LPMRP parts and consequently will be processed after those part numbers in Block 204 of FIG. 2.

Once the initial set of non-critical part numbers has been determined in Block 701 of FIG. 7, the next step is to identify what other parts must also be non-critical. This is done in Block 702 which takes the initial set of non-critical parts and explodes them through their bills of material supply chains to find all of their components and sub-components. All parts lying below the initial set of non-critical parts in the bills of material must also be non-critical and thus are classified as such in Block 702. For example, suppose that the planner designates part G of FIG. 8 as non-critical in the method referenced in Block 701 of FIG. 7. The step in Block 702 which explodes all non-critical parts down through the bills of material will result in parts H and J (FIG. 8) also being classified as non-critical.

Block 703 of FIG. 7 identifies an initial set of parts which will require the LPMRP method. The method first examines a "Build Options File" which contains the processes available for manufacturing each part number at each plant location. Each part which may be built using more than one process at a plant becomes a part requiring the LPMRP method. Multiple processes are modeled for a part number if the part may be built using different yields, cycle times, binning percentages, or bills of material. Part A of FIG. 5 is one such part number falling into this category of LPMRP parts since it has different processes, each with its own bill of material. Block 703 further identifies as LPMRP parts those part numbers which may be substituted for or by another part number which does not result as output from the same binning process. Parts A, C, O, and F of FIG. 6 are examples of parts which are identified as LPMRP parts because of this logic. So are parts A and B of FIG. 8.

Figure 8:
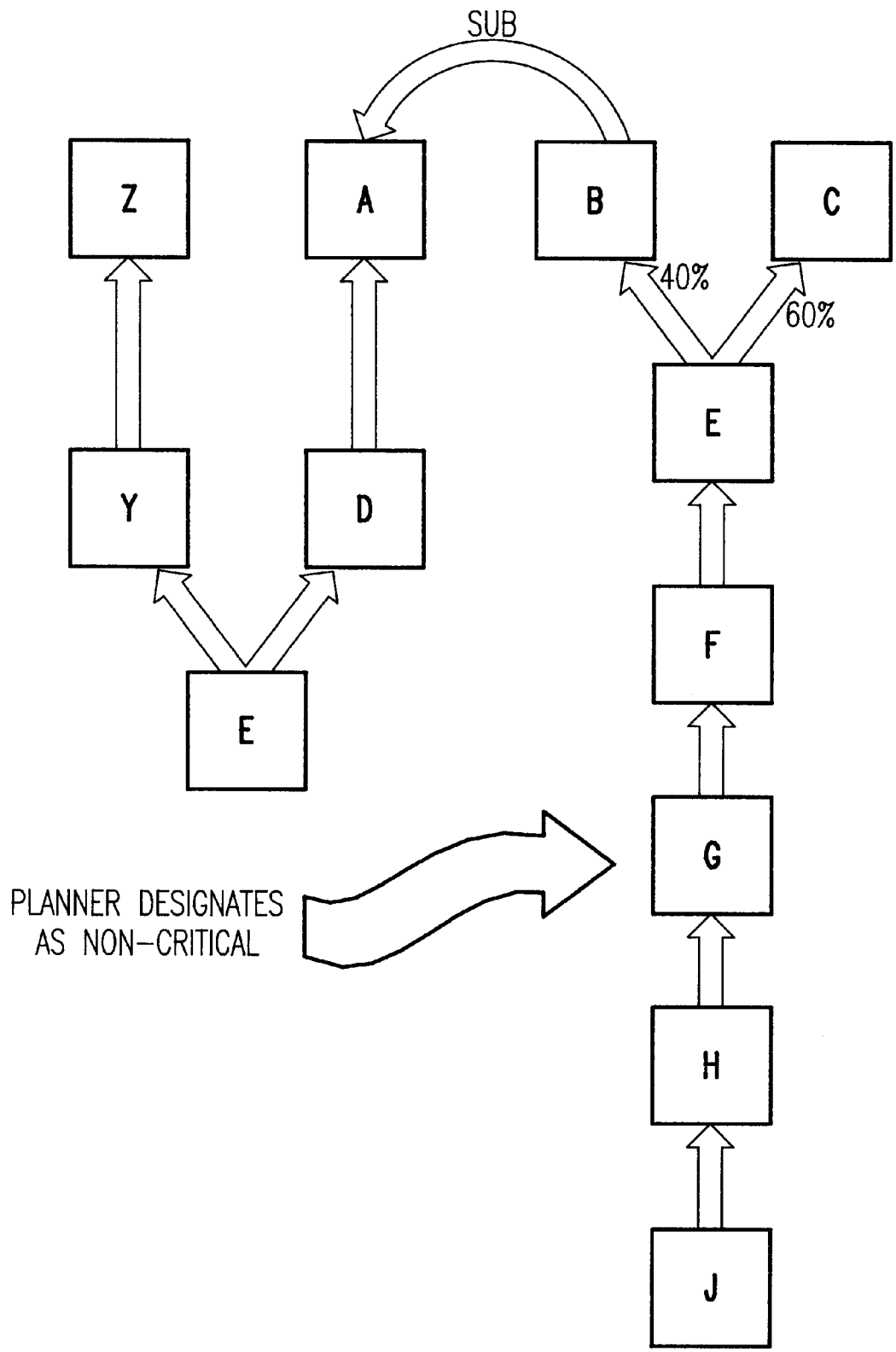
FIG. 8 is a block diagram of bills of material supply chains used in explaining the classification of parts as MRP, LPMRP, or Non-critical.

Block 704 of FIG. 7 takes the initial set of LPMRP parts (from Block 703) and explodes them downwards through their bills of material supply chains to identify additional parts which must be categorized as LPMRP parts. For example, in FIG. 8, since parts A and B were LPMRP parts (as identified by Block 703), Block 704 will explode these parts through their supply chains resulting in parts D, X, E, and F being classified as LPMRP parts. The explosion along a bills of material supply chain stops when it runs into a non-critical part; consequently, parts G, H, and J of FIG. 8 do not become LPMRP parts (they remain non-critical). Subsequent to the explosion, all parts identified as LPMRP parts are "imploded" up their bills of material supply chains identifying each part along the way as an LPMRP part. In this way, parts E and X of FIG. 8 are imploded up the bills of material resulting in parts C, Y, and Z being classified as LPMRP parts. Each part identified during an implosion as an LPMRP part is further exploded to identify additional LPMRP parts. For instance, if part Z of FIG. 8 had any components besides part Y, those components and their sub-components would also be identified as LPMRP parts, as long as they were not previously identified as non-critical. The explosions and implosions continue iteratively in this manner until all parts above every LPMRP part in the bills of material are classified as LPMRP parts as are all parts below the LPMRP parts other than those defined as non-critical.

Block 705 of FIG. 7 identifies as MRP parts all those part numbers which have not been previously classified as either LPMRP or non-critical parts. As a result, these parts will be processed using the (fast) MRP process of Block 202 of FIG. 2. The Block 202 MRP method may be executed in parallel with the Block 203 LPMRP method. Once both methods have been completed, the Block 204 method is executed.

Figure 9:
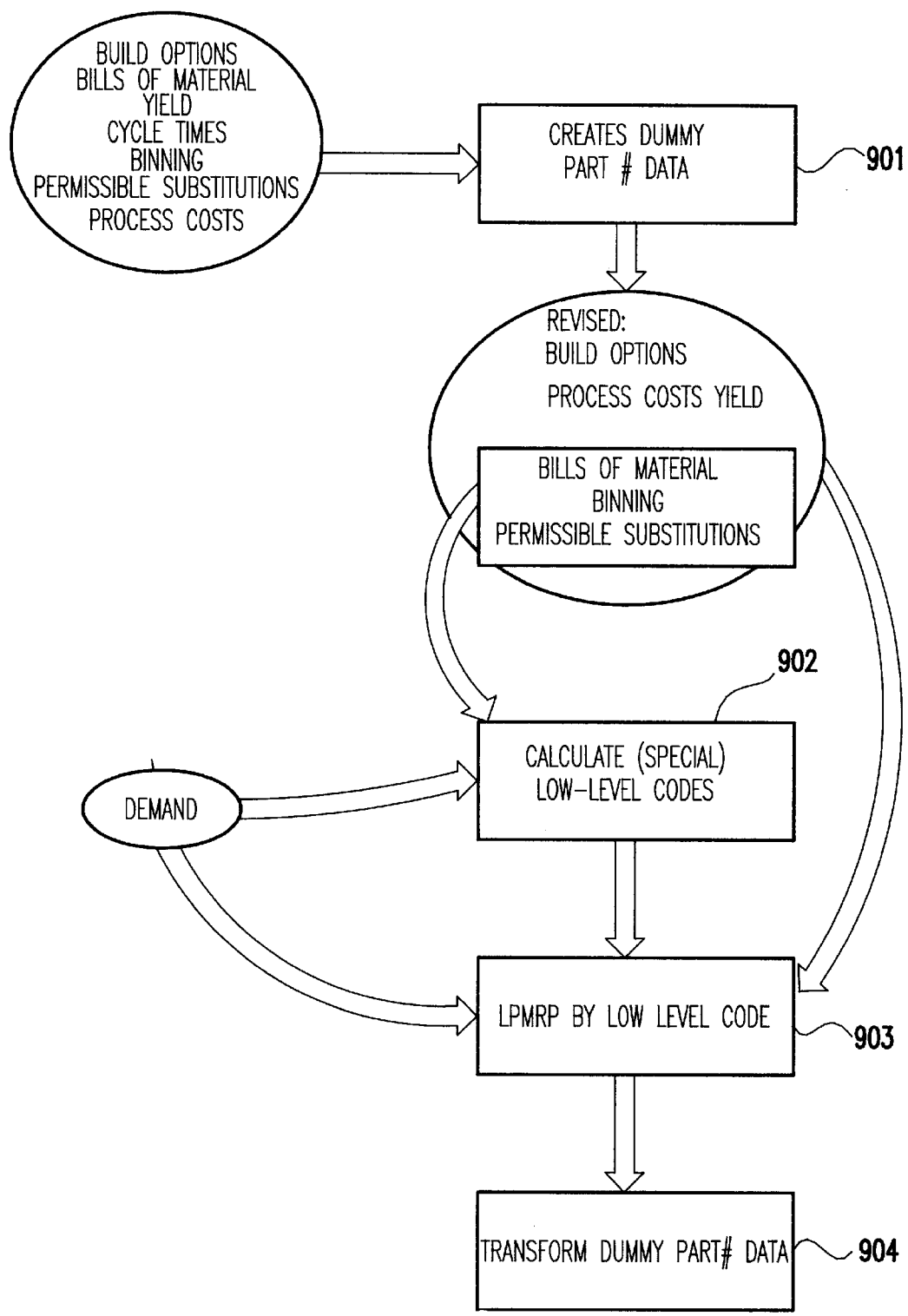
FIG. 9 is a flow diagram of the steps used in the method for processing LPMRP parts.
Figure 10:
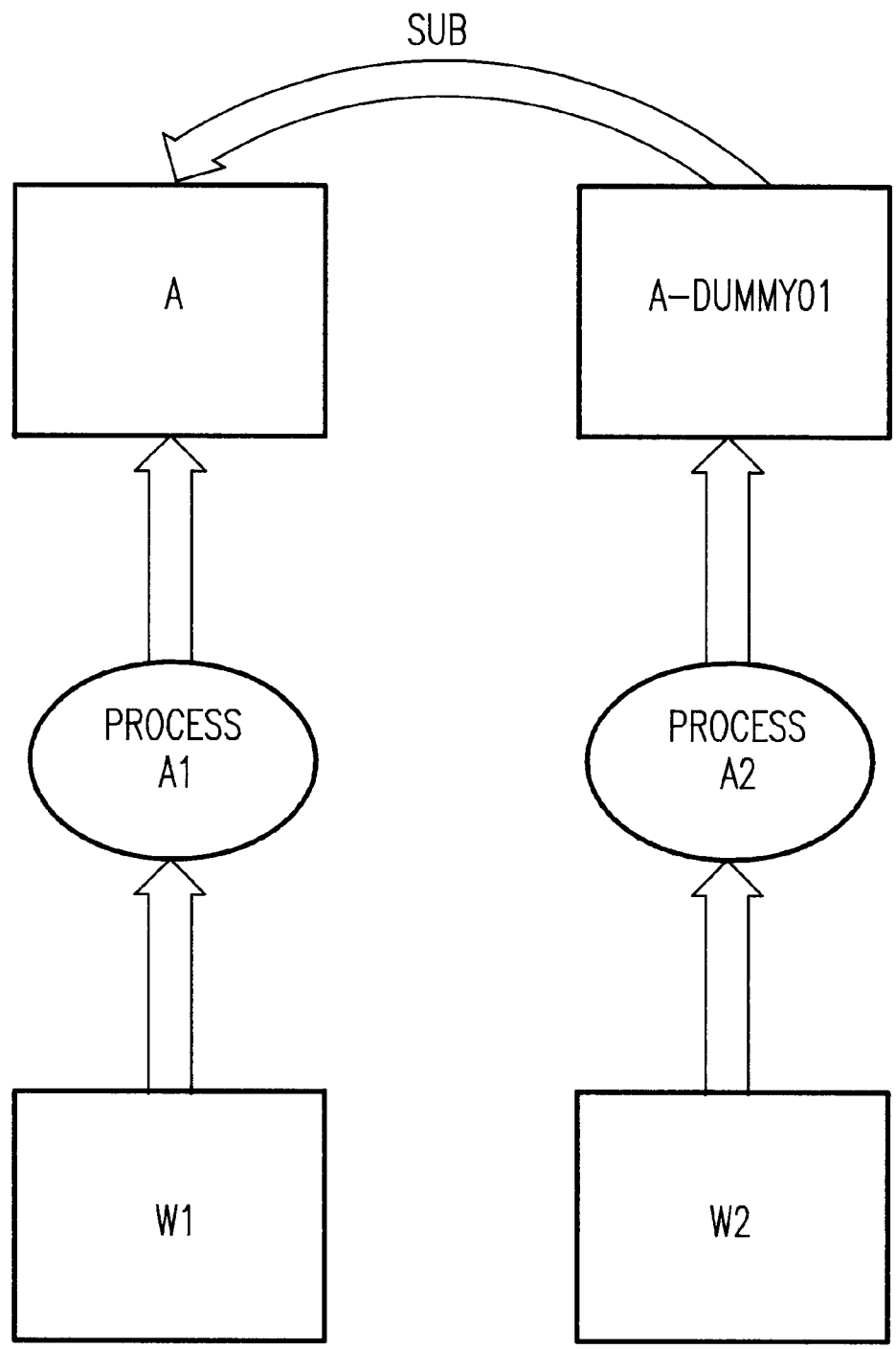
FIG. 10 is a block diagram showing an alternative single-process representation of the diagram shown in FIG. 5.

The processing of LPMRP parts (referenced in Block 203 of FIG. 2) is expanded upon in FIG. 9. The first step of processing LPMRP parts is shown in Block 901 of FIG. 9 where "dummy part numbers" and their associated data are created as a result of transforming the multiple-process data into an "equivalent" single-process representation which is easier to solve. We will explain this transformation by referring to FIG. 5 where part A may be manufactured using either process A1 or process A2. The result of transforming the dual-process representation of FIG. 5 into a single-process per part number representation is shown in FIG. 10. In FIG. 10, a dummy part number (in this case, A-dummy01) is created to represent the output of new releases made using process A2. All data relevant to part A and process A2 in the untransformed representation (build options, yields, binning, bill of material, and processing cost) become associated with part A-dummy01 and process A2 in the transformed representation. Furthermore, a relationship is added indicating that part A may be substituted by part A-dummy01 at zero substitution cost. Consequently, the theoretical optimal releases that would be made for part A using process A2 in the dual-process representation are equivalent (i.e. the same release quantities and dates) to the theoretical optimal releases that would be made for part A-dummy01 using process A2 in the transformed representation. Thus, the transformation did not cost anything in terms of solution quality, but altered the initial data conditions into a problem which is easier to solve. The logic of extending the dual-process to single-process transformation into a transformation of multiple-processes (per part number, plant location) to single-process (per part number, plant location) is a natural one and easily recognizable by one practiced in the art. The single-process per part number representation is that used by Blocks 902 and 903 described below.

In Block 902 of FIG. 9, the bills of material low-level codes will be identified. Those practiced in the art are aware of a number of methods for calculating low-level codes which are suitable for standard MRP processing. However, these known methods result in low-level codes which are unsuitable for Advanced MRP processing due to the presence of alternate processes and complex substitutions. Consequently, a new method is required and proposed to determine the "special" low-level codes necessary for the Advanced MRP processing. These low-level codes still fulfill the standard MRP requirement that all component part numbers have low-level codes which are numerically greater than the low-level codes of their assemblies. However, these special low-level codes also fulfill the additional AMRP requirement that each part has the same low-level code as all parts for which it may substitute. Also, it fulfills yet another AMRP requirement that each part number resulting as output of a binning process has the same low-level code as all other part numbers output from that binning process. Our preferred embodiment of this invention implements the determination of the special low-level codes as follows.

Each part number is assigned an initial low-level code of zero. The part numbers' low-level codes may be subsequently increased (never decreased) as the method continues. Each part number in the independent demand file has its low-level code increased to one. For those parts and all other parts which have their low-level code increased subsequently during this method, their component and "sibling" parts are checked to see if their low-level codes need to be increased. If a component has a low-level code which is less than one plus the low-level code of its assembly, then the component's low-level code must be increased to one plus the low-level code of its assembly. A part is a sibling of another part number if it results from the same binning process. A part is also a sibling of another part number if it may be substituted for or by that part number. When a part's low-level code is increased, all siblings of the part number have their low-level code increased to the same value. The method assumes that no parts have siblings for components or sub-components, which is a reasonable assumption in practice.

In Block 903 of FIG. 9, each (special) low-level code of the bills of material of the LPMRP parts is processed. This process begins at the top of the bills of material (low-level code of one) and proceeds one low-level code at a time until all parts have been processed. The steps involved in processing one low-level code are shown in FIG. 11.

Figure 11:
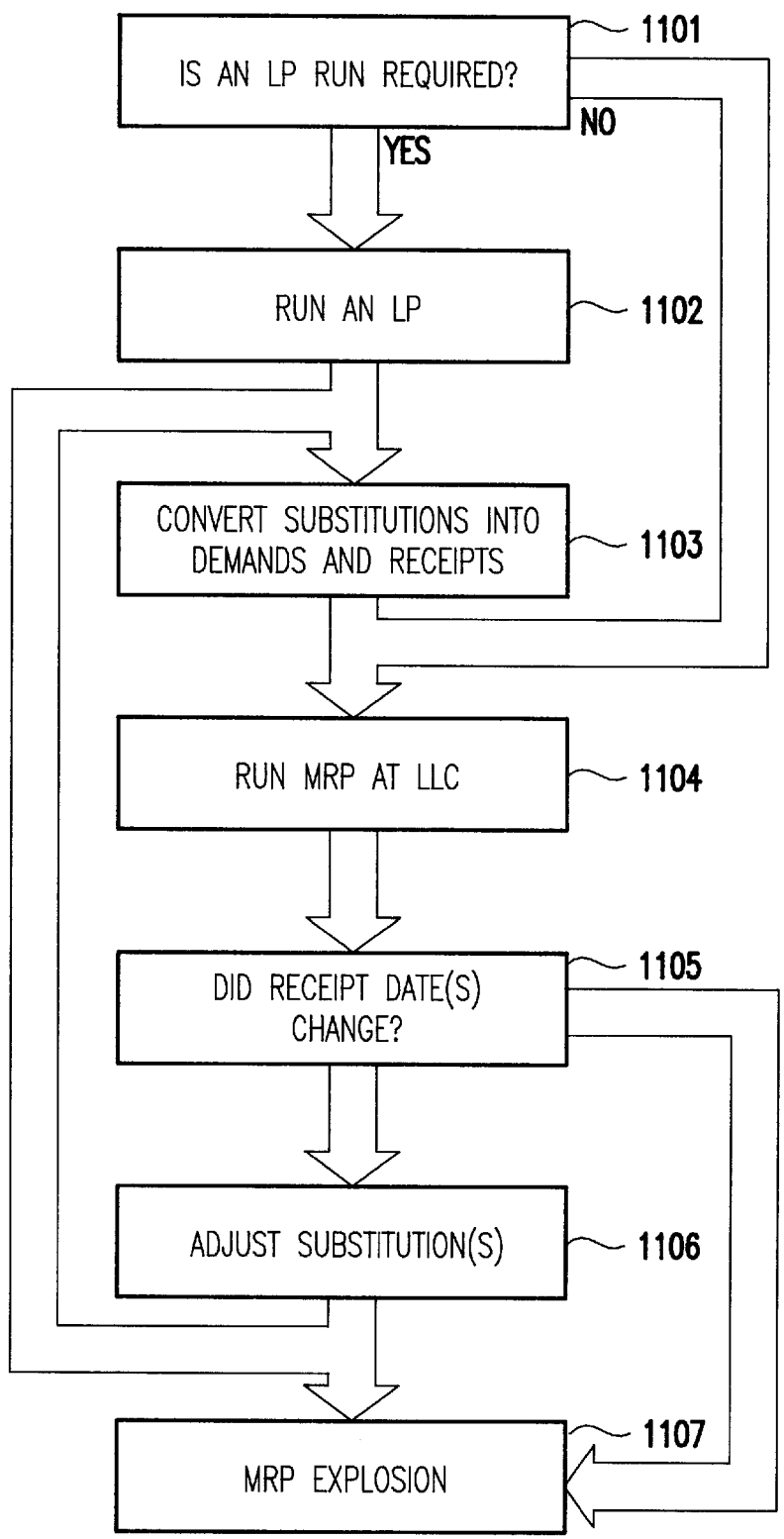
FIG. 11 is a flow diagram showing the flow of the method for processing LPMRP parts at the current low-level code.

First, Block 1101 of FIG. 11 determines whether an LP run is required to process the current low-level code. An LP run is required if and only if there is a pair of part numbers which have the current low-level code and exist in the substitution file and do not result as output of a same binning process. (Keep in mind that each part number with alternate processes in the original data files exists in the substitution file in the single-process per part number representation being used in this Block 903 of FIG. 9.) If an LP run is required, then Blocks 1102 and 1103 of FIG. 11 are invoked; otherwise, an LP run is not required and the method proceeds directly to Block 1104 of FIG. 11 for the MRP run at that low-level code.

Block 1102 of FIG. 11 invokes an LP run for all part numbers with a low-level code greater than or equal to the current low-level code. Hence, the LP considers the inventory, yields, binning percentages, and cycle times of the underlying supply chain. (The LP may be similar to that described in detail in the BCD solver disclosed in application Ser. No. 08/926,131 (IBM Docket BU9-96-194.) Each substitution resulting from the LP (Block 1102) may be viewed as a planned reduction of inventory for the substituting part number and a planned addition to inventory for the substituted part number. Consequently, a corresponding demand record is created for the substituting part and a corresponding receipt record created for the substituted part (Block 1103). These additional demand and receipt records are then fed into an MRP method (Block 1004) which only processes the current low-level code and thus only requires the additional demand and receipt records for parts at that level of bills of material. By implicitly feeding the LP substitutions into MRP, the resulting material requirements plan will benefit from the LP capability of determining optimal substitutions (and processes) as well as the MRP benefits of lot-sizing and so forth. Because the (intelligent) MRP does a good job of determining substitutions around simple binning processes and because the MRP uses daily time bucket granularity (which is more precise than the LP is typically able to use), some substitutions recommended by the LP (Block 1102) will not be fed as demands and receipts into the MRP method of Block 1104. Those substitutions not fed to MRP by Block 1103 are those in which both the substituted and substituting part numbers result as output of at least one same binning process. In such cases, the MRP will determine the appropriate substitutions.

The MRP method of Block 1104 of FIG. 11 is performed for parts at the current low-level code and includes all steps normally associated with a low-level code's MRP processing except that the usual final step of exploding to the next level of the bills of material is not included for non-binned parts. (Binned parts are immediately exploded which makes sense to one skilled in the art once he or she understands the implications of the earlier discussion on processing binned parts within an intelligent MRP.) Because the MRP executes with daily time bucket granularity for all periods (unlike most LP runs) and also allows temporal infeasibilities (also unlike LP runs), the MRP may determine that some of the receipts created from LP substitutions are needed earlier than planned by the LP in order to meet demand. If this is the case, then the planned substitutions have their dates adjusted to the MRP determined dates of need (Block 1106) and Blocks 1103 and 1104 are repeated. Once the MRP receipt dates corresponding to the LP substitutions no longer change (which is checked in Block 1105), the MRP Explosion for non-binned parts (Block 1107) is executed. Typically, an MRP will only need to be run once or twice in practice per low-level code, although theoretically, additional iterations could be required.

Figure 12:
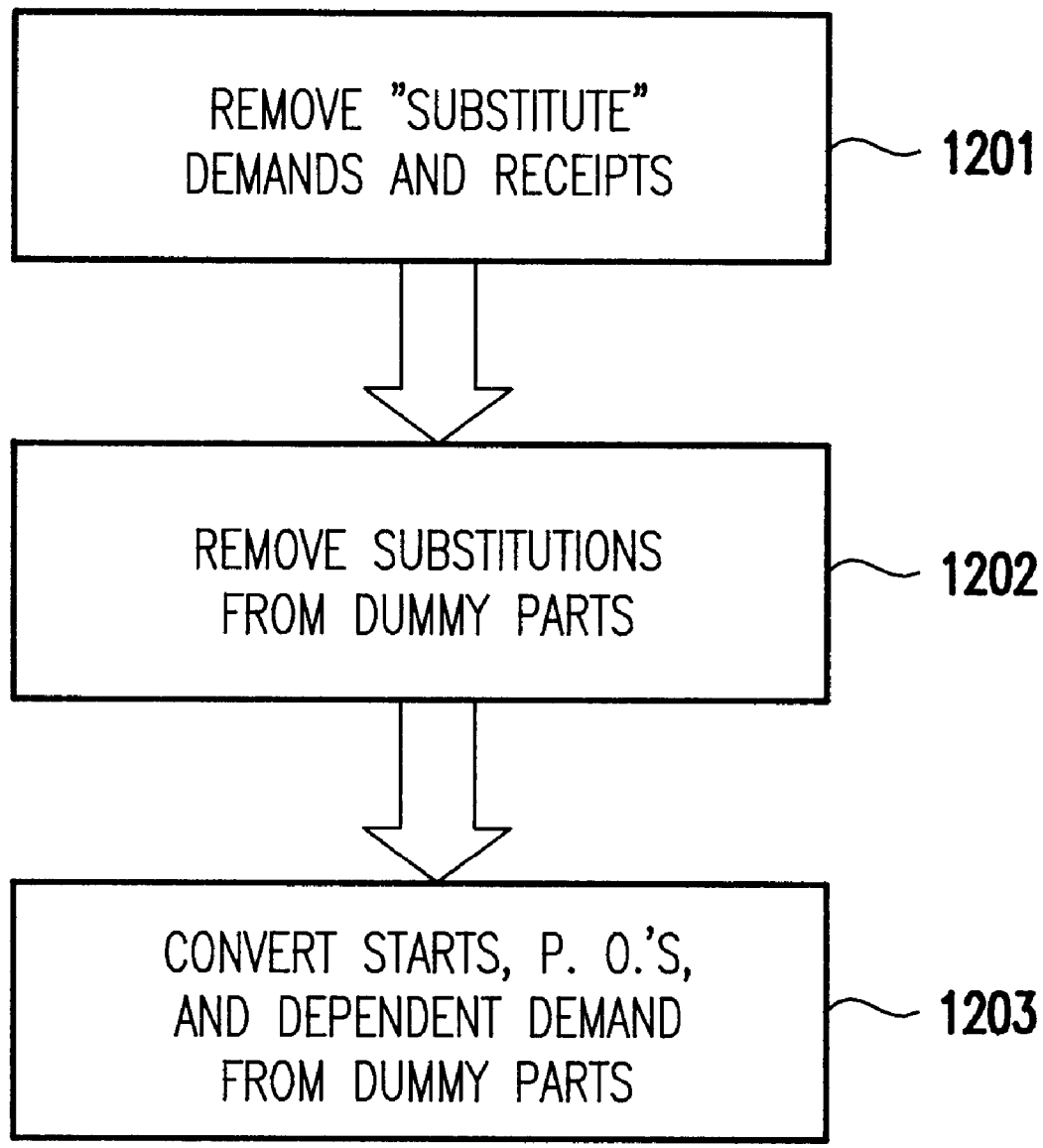
FIG. 12 is a flow diagram showing the steps of the method for transforming the "dummy part number" data into that of a multiple process per part number representation.

Once Block 903 of FIG. 9 has completed, the resulting material requirements plan still contains the "dummy part numbers" which need to be removed. First, all demand and receipt records in the plan corresponding to substitution records created by the LP are removed in Block 1201 of FIG. 12. Secondly, since substitutions involving dummy parts represent alternate processes rather than real substitutions, such substitution records are removed in Block 1202 of FIG. 12. Finally, all manufacturing starts, purchase orders, and dependent demands created for the dummy parts are transformed into starts, purchase orders, and dependent demands by simply replacing the dummy part number with the original part number in each of those records. The results from that Block 1203 step contain the final material requirements plan for the LPMRP parts.

Block 204 of FIG. 2 processes the non-critical part numbers and is explained as follows. All assembly part numbers are identified which have a non-critical part number as an immediate component in the bills of material file. For each of those identified assembly parts which were processed in either Block 202 or Block 203, the dependent demand they created on non-critical parts is merged into the demand file for non-critical parts along with any independent demand for these non-critical parts. That total demand for non-critical parts is then used as input for the final MRP run which processes the non-critical parts. Once that non-critical parts MRP run has completed, all output from the three runs are consolidated into a single resultant so that all post-AMRP processes (e.g., reporting, interfaces to Manufacturing Execution Systems, etc.) may be blind to the internal processing and characteristics of the AMRP method.

Summarizing, what has been disclosed is an advanced material requirements planning (AMRP) solver that matches existing assets and demands across multiple manufacturing facilities. The AMRP method according to the invention has particular application in the microelectronics and related manufacturing. To accomplish the (matching) task of deciding what actions need to be taken to meet customer demand, the AMRP method explodes demands into a build plan for purchased and manufacturing orders for end items as well as components and raw materials necessary to produce those end items. Among the information calculated is (a) recommended future manufacturing starts (planned manufacturing orders), (b) recommended new purchase orders, (c) calculation of "need date" for each WIP lot in the manufacturing line based on when the lot is required to meet customer demand, (d) recommended alterations to purchase orders guided by user set rules, (e) recommended part number substitutions, and (f) recommended interplant shipments in a multi-site environment.

The preferred embodiment of the invention has the following components: (a) a method which classifies each part number (based on its characteristics and those of parts connected to it in the bills of material supply chain) as an MRP part, an LPMRP part, or a non-critical part; (b) an MRP run for parts with only simple substitutions around binning processes; (c) an LPMRP run for the (complex) LPMRP parts; and (d) an MRP run for the non-critical parts. The LPMRP method includes a series of integrated LP and MRP runs at each level of the bills of material.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer implemented decision support method which intelligently matches assets with demand to create a material requirements planning (MRP) match to determine what work needs to be accomplished to meet demand comprising the steps of:

accessing a bill of materials in computer memory to identify parts by part numbers of a product to be manufactured;

classifying each part by part number as MRP, Linear Programming (LP) MRP, or non-critical, LPMRP parts being identified from binning data and data related to permissible substitutions and build options as those parts which may be substituted for or by another part number that does not result as output from the same binning process, non-critical parts being identified by a planner using the method as those which can be run with MRP as can components and sub-components of the non-critical parts, and MRP parts being those not classified as LPMRP parts or non-critical parts;

accessing a build options file, a bill of materials file, binning data and permissible substitutions data in computer memory and processing LPMRP parts using a series of integrated LP and MRP methods;

processing MRP parts and non-critical parts using a heuristic method; and consolidating output from the processing steps using linear programming and heuristic methods and providing a single output file.

2. The computer implemented decision support method recited in claim 1 wherein the step of classifying each part by part number comprises the steps of:

identifying an initial set of non-critical parts;

identifying all non-critical parts by exploding through the accessed bill of material;

identifying an initial set of LPMRP parts by examining situations with alternate processes and/or substitutions outside of binned processes;

identifying a complete set of LPMRP parts by iteratively exploding down and imploding up through the accessed bill of material; and identifying as MRP parts all parts not previously identified as non-critical parts or LPMRP parts.

3. The computer implemented decision support method recited in claim 1 further comprising the step of transforming a multiple process per part number representation into a single process per part number representation.

4. The computer implemented decision support method recited in claim 1 further comprising the step of determining low-level codes such that each part number has a same low-level code as all parts for which it may substitute, and each part number resulting as output of a binning process has a same low-level code as all other part numbers output from that binning process.

5. The computer implemented decision support method recited in claim 4 wherein the processing of LPMRP parts component comprises the step of running an integrated LP and MRP process at each level of the bill of material.

6. The computer implemented decision support method recited in claim 5 wherein the LPMRP processing further comprises the steps of:

determining whether an LP method is required at each low level code;

invoking an LP method at each required low level code;

taking an output of the LP run and feeding its resulting substitutions (and implicitly alternate processes) into an MRP method for that low level code; and invoking an MRP method which considers LP substitutions as demands and receipts.

7. The computer implemented decision support method recited in claim 1 wherein the processing of any non-critical parts comprises the steps of:

gathering dependent demand for non-critical parts stemming from the MRP and LPMRP methods; and executing an MRP run for the non-critical part numbers.

* * * * *

Disclaimer 5,943,484 — Robert J. Milne, Jericho; Robert A. Orzell, Essex Junction, both of VT.; Chih-Kuan Yen, Ann Arbor, MI. ADVANCED MATERIAL REQUIREMENTS PLANNING IN MICROELECTRONICS MANUFACTURING. Patent dated Aug. 24, 1999. Disclaimer filed by the assignee, Oct. 4, 2006, International Business Machines Corporation.

Hereby enters this disclaimer to all claims of said patent.
(*Official Gazette February 27, 2007*)